E. W. WOLFE.
Couplings for Tubing.
No. 156,006. Patented Oct. 13, 1874.
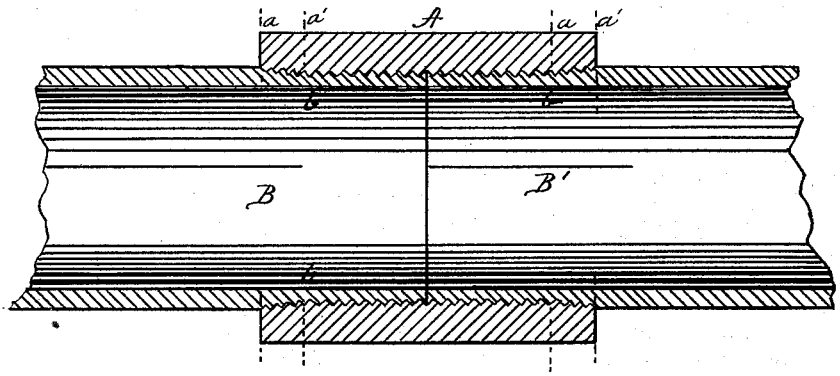
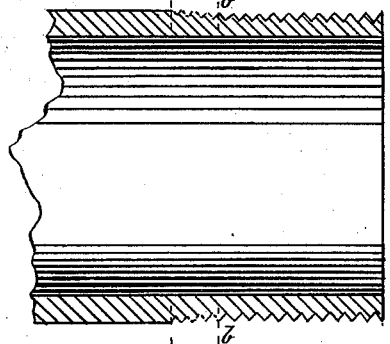 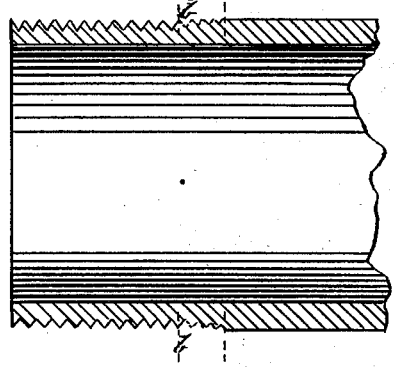
WITNESSES
E. C. Fitter.
Frederick Standish
INVENTOR
Edward W. Wolfe
by Bakewell & Kerr
Attys

## UNITED STATES PATENT OFFICE.

EDWARD W. WOLFE, OF PITTSBURG, PENNSYLVANIA, ASSIGNOR TO EVANS, DALZELL & CO., OF SAME PLACE.

IMPROVEMENT IN COUPLINGS FOR TUBING.

Specification forming part of Letters Patent No. 156,006, dated October 13, 1874; application filed August 28, 1874.

*To all whom it may concern:*

Be it known that I, EDWARD W. WOLFE, of Pittsburg, in the county of Allegheny and State of Pennsylvania, have invented a new and useful Improvement in Coupling for Tubing; and I do hereby declare the following to be a full, clear, and exact description thereof, reference being had to the accompanying drawing, making a part of this specification, in which—

Figure 1 is a section of the pipe and coupling, and Fig. 2 is a section of the tubing upon a larger scale.

Like letters of reference indicate like parts in the several figures.

My invention relates to couplings for pipe for oil-wells, steam, and similar tubing; and consists in reducing the length of the thread upon the end of the pipe, so that it shall be less than half the length of the threaded portion of the coupling or socket used, so that the thread of the coupling or socket shall extend up onto the unthreaded portion of the pipe biting thereon, and embedding itself, so that no vibration between the coupling is possible, and any tendency of the pipe to break at the point of coupling is obviated.

The object of this invention is to overcome the heretofore-existing tendency, where great lengths of pipe are used, to break at or about the joints—generally at the last portion of the thread, just at the edge of the coupling or socket. This breakage is conceived to be due to the vibration consequent on the length and weight of the pipe, and, as heretofore made, the thread of the pipe extending up to, and sometimes beyond, the edge of the socket allowed the strain to come on a portion of the pipe already weakened by cutting the thread thereon, and, as a consequence, more likely to break under weight or strain.

This difficulty is overcome by me by breaking off the thread at less than half the length of the socket, so that the thread of the socket or coupling shall extend beyond the thread of the pipe biting upon the uncut portion of pipe, which prevents any vibration between the coupling and the pipe, and gives the additional advantage of assisting in packing the joints.

In the drawing referred to, A indicates the coupling, and B B' the tubing, the threaded end of the tube B being received within the coupling A. The coupling A is of the usual form throughout its greater length, with the exception of the short distance at either end between the points *a a'*, where there is a slight increase in the diameter of the bore, and the threads, instead of terminating regularly, are preferably more like half-threads extending entirely around the socket, the remainder of the couplings between these points being formed with a thread, the same as usual, and the sides thereof being parallel. B B' indicate the tubing with which the main points of the invention have to deal. The tubing is threaded in the usual manner from the end up to the point *b*, where the thread terminates, said distance being from one-quarter to three-quarters of an inch less in length than one-half of the length of the coupling to be employed. Beyond the said point the pipe is as usual.

The object of reducing the length of the thread will be apparent when describing the method of coupling, which is as follows: The ends of the tubing B B are screwed into the socket in the usual manner, so as to meet about midway of the socket. In so doing, the threads upon the end of the tube being less in length than one-half of the threaded portion of the socket, the portion of the socket between *a* and *a'*, Fig. 1, forces its way up onto the unthreaded end of the tubing beyond the point *b*, embedding itself, and, forming a slight thread of its own, biting upon the pipe, so that the material will not be removed from the tubing, as in the ordinary method of threading, but will be impacted, whereby the union is formed between the points *a a'* of the coupling without weakening the tube B, the coupling extending beyond the thread upon the tubing, so as to take the breaking strain off from the thread.

The advantages of my improvement are that the vibration between the coupling and the tubing is avoided, and the breaking-strain is transferred from the last thread, or the threaded end of the pipe, from which substance has been removed to a point farther up upon the tubing, where the usual weight of metal remains, and which is equally strong with any portion of the pipe; and the thread of the coupling, seating itself around the unthreaded portion of the pipe, assists in obtaining a water-tight joint, obviating the use of packing or sealing, as has heretofore been required.

I am aware that the socket or coupling has been formed with a right and left hand thread, one of which tapered to form the thread upon an unthreaded end of lead tubing, and also that a portion of the socket has been left unthreaded to extend up on and support the tubing, and lay no claim thereto.

Having thus described my invention, I claim—

The socket A, in combination with the tubing B B', the tubing being threaded to an extent less than half the length of the threaded portion of socket A, so that the thread of the socket shall extend up on and bite into the unthreaded portion of the tubing, substantially as specified.

In testimony whereof I, the said EDWARD W. WOLFE, have hereunto set my hand.

EDWARD W. WOLFE.

Witnesses:
WILLIAM F. ROBB,
JOHN EVANS.